United States Patent Office 2,865,963
Patented Dec. 23, 1958

2,865,963
PROCESS FOR PREPARATION OF KETONES

Paul K. Garetson and Alfred Steitz, Jr., Tulsa, Okla., assignors to Pan American Petroleum Corporation, a corporation of Delaware No Drawing. Application April 9, 1956
Serial No. 576,785

4 Claims. (Cl. 260—596)

This invention relates to the preparation of valuable oxygenated compounds from alcohols. Broadly the invention is related to a process for preparing high molecular weight alcohols from alcohols of lower molecular weight; however, we have discovered conditions under which the alcohols charged can be made to react to produce a product mixture consisting predominantly of ketones.

Processes involving the reaction:

in the presence of an alkaline condensing agent such as, for example, an alkali metal alcoholate, have been known for some time. Such reactions were generally effected at relatively high pressures and temperatures in an autoclave. However, the yields of higher molecular weight alcohols were quite poor and no formation of ketones was reported. Later work resulted in somewhat improved yields of alcohols by the use of a dehydrogenation catalyst in addition to the alkaline condensation catalyst. The process was carried out at atmospheric pressure and the water of reaction was continuously removed as formed. The reaction under such conditions, however, proceeds slowly, particularly with the lower molecular weight alcohols. Likewise no ketones were reported to have been formed in procedures of this type.

Accordingly, it is an object of our invention to provide a novel method for synthesizing ketones by a modification of a process which has previously been recognized as a method for preparing alcohols.

Fundamentally, the process of our invention involves effecting condensation of a mixture of primary and secondary alcohols of the same or different carbon number, in the presence of a suitable condensing agent, a dehydrogenation catalyst, and at elevated temperatures and pressure while continuously removing water, as formed, from the reaction mixture. Under these conditions, as generally set forth, we have found, contrary to the results which would be expected from previous work in this field, that a mixture of reaction products is formed, the major component of which is ketones. Minor amounts of alcohols and acids are also produced.

In carrying out the process of our invention the desired secondary alcohol or mixture of secondary and primary alcohols is introduced into a suitable pressure vessel equipped with a fractionating column and a means for continuously removing the water of reaction. Thereafter, a dehydrogenation catalyst, a water entrainer, or azeotroping agent, and a suitable alkaline condensing agent are added. The pressure within the vessel is then increased by the addition of an inert gas until a pressure of from about 75 to about 500 p. s. i. g. is obtained; preferably from about 90 to about 150 p. s. i. g. The pressure employed should, of course, be sufficient to maintain the reaction mixture in the liquid phase at the specific temperature employed. Such pressure will depend on the molecular weight of the alcohol or alcohols used. Generally, however, the temperature should be at least about 130° C. to effect proper reaction of the lower alcohols, e. g., the $C_3$ alcohols. Heat is applied to the reaction vessel and as the contents thereof are warmed up, nitrogen or other inert gas originally used to pressurize the system is vented therefrom through a pressure control valve. Any hydrogen produced during the process may likewise be vented to maintain the pressure within the desired limits.

The dehydrogenation catalyst used may be selected from a number of known metals and alloys such as, for example, nickel, copper, bronze, and platinum, oxides of iron, cobalt, nickel and manganese, nickelous carbonate, copper acetate and salts of the foregoing metals and other organic acids. Normally, however, we prefer to employ a finely divided nickel dehydrogenation catalyst, for example, a mild hydrogenation catalyst such as U. O. P. nickel catalyst which consists of finely divided nickel on a suitable inert carrier or support such as kieselguhr, silica gel or the like. Use of more active dehydrogenation catalysts tends to result in the formation of acid salts in predominating amounts. The catalyst may generally be used in concentrations ranging from about 0.2 to about 4.0 grams per mol of alcohol or alcohols present in the reaction mixture.

While alkaline condensation catalysts in general may be employed in the process of our invention we ordinarily prefer to use alkali metal alcoholates for this purpose. Condensation catalysts of this type are prepared, preferably, by adding approximately 0.175 mol of the alkali metal, e. g. sodium, for each mol of alcohol in the reaction mixture. Prior to formation of the alcoholate it is generally preferable to sweep out any moisture in the equipment with dry nitrogen or any other suitable inert gas. In order to force the reaction to completion it is sometimes necessary to supply heat to the mixture to increase speed of reaction of the alkali metal. If desired sodium or potassium hydroxides may be used in place of the free alkali metal to prepare the alcoholate.

Alcohols which may be used in the process of our invention may be selected from a wide range of primary and secondary alcohols. As an example of such alcohols there may be mentioned ethanol, 1-propanol, 2-propanol, the $C_4$ alcohols, including 1-butanol, 2-butanol and isobutyl alcohol, the primary and secondary $C_5$ alcohols, and the like. While the process of our invention is applicable to primary and secondary alcohols in general, we ordinarily prefer to use the lower molecular weight alcohols, i. e. $C_2$–$C_5$ alcohols. In this connection we wish to point out that one of the more surprising features of our invention is that while primary alcohols alone do not tend to form ketones when subjected to the reaction conditions defined herein, such alcohols, in the presence of secondary alcohols, do react in a manner not clearly understood by us, to produce ketones of a type not found when the secondary alcohols alone are subjected to the reaction conditions of our invention. Thus, for example, when isopropyl alcohol is the sole alcohol employed, the ketone produced is acetone. However, when both 1-propanol and isopropyl alcohol are used two other ketones, 2-hexanone and di-n-butyl ketone are obtained in addition to acetone.

Entraining or azeotroping agents suitable for use in removing water of reaction as formed in the process of our invention may be selected from a wide range of materials. As examples of such agents there may be mentioned aliphatic and aromatic hydrocarmbons such as hexane, benzene, toluene and the like. While removal of water from the reaction mixture in the form of an azeotrope is a conventional way to accomplish such object, water may be effectively removed or "tied-up," insofar as the involved reaction is concerned, in any of a number of other ways. For example, a suitable dehydrating agent such as anhydrous sodium sulfate, boric anhydride, calcium chloride, etc., may be employed.

The temperature used in the present process should be sufficient to cause the reactants to boil or reflux at the pressure employed. Within reasonable limits, higher temperatures appear to aid the desired reaction: presumably by the fact that the condensation and/or dehydrogenation reactions involved are favored thereby.

The process of our invention may be further illustrated by the following specific example.

EXAMPLE

In obtaining the results appearing in the table below, in accordance with the reaction conditions also shown in said table, a stainless steel pressure still fitted with a stainless steel reflux condenser was employed. At the top of the condenser a manostat was employed to regulate the pressure within the system. The reflux condenser was packed with No. 2917 "Heli-Pak" stainless steel helices. A Jerguson sight glass was employed to collect the water layer as it azeotroped overhead during the reaction. Prior to initiating the reaction the apparatus was assembled and pressure tested with nitrogen. The reactants were refluxed until no additional water was separated or until it appeared that no water would separate within a reasonable length of time. Thereafter, the reaction mixture was cooled to near room temperature, the materials in the still pot and azeotrope receiver were combined and 250 ml. of water was added. The catalyst was filtered out, the layers separated and the organic layer water washed. The combined aqueous layers were extracted with di-isopropyl ether and the extract added to the organic layer. The raffinate aqueous layer was fractionated and the overhead material boiling up to 90° C. was added to the organic layer. The organic phase was then dried over sodium sulfate and thereafter fractionated.

distribution, as obtained in runs 2 and 3 are shown in detail in the table below.

Table II

| Run No. | 2 | 3 |
|---|---|---|
| | Mol Percent | Mol Percent |
| Acetone | 5.3 | 9.8 |
| 2-Hexanone | 8.0 | 8.3 |
| 2-Hexanol | 8.2 | 5.9 |
| Di-n-Butyl ketone | 5.3 | 8.9 |
| Acid (as propionic acid) | 16.5 | 14.8 |
| Unreacted C₃ alcohol | 24.9 | 19.0 |
| Starting alcohol accounted for, Mol Percent | [1]68.2 | [1]66.7 |

[1] These figures do not include an alcohol content of 20.3% and 20.6%, respectively, in the pot residue from runs 2 and 3.

It will be appreciated from the foregoing description that the process of our invention is subject to numerous variations and modifications without departing from the scope thereof. For example, the primary and secondary alcohols employed in our invention need not be of the same carbon number. Also mixtures of one or more primary alcohols with one or more secondary alcohols of the same or different number of carbon atoms may be used as the reaction mixture if desired.

We claim:

1. In a process for the preparation of ketones, the improvement which comprises subjecting a liquid reaction mixture comprising a primary alcohol and a secondary alcohol, said primary alcohol having at least two carbon atoms and said secondary alcohol having at least three carbon atoms, to a pressure ranging from about 75 to about 500 p. s. i. g. and a temperature corresponding to about the reflux temperature of said reaction mixture at said pressure, in the presence of an alkaline condensa- Table I

| Run No. | 1 | 2 | 3 |
|---|---|---|---|
| Reactants: Alcohol including alcoholate, g. mol | 1-propanol, 5.9 mols | 1-propanol, 3 mol; 2-propanol, 3 mol | 1-propanol, 2.9; 2-propanol, 3.0. |
| UOP Ni Catalyst (−100 mesh), g | 8 | 8 | 8. |
| Alcoholate: | | | |
| Alkali used | Sodium | Sodium | Sodium. |
| g. atoms | 1.05 | 1.05 | 1.05. |
| Reaction Conditions: | | | |
| Pot temp., °C | 110–154 | 132–149 | 130–140. |
| Pressure, p. s. i. g | 100 | 110 | 110. |
| Total reflux time, hrs | 20 | 15.5 | 22. |
| Products: | | | |
| Unreacted charge alcohol, g | 69.2 | 1-propanol, 28.4; 2-propanol, 63.5 | 1-propanol, 23.3; 2-propanol, 44.6. |
| 2-Methyl, 1 pentanol | 60.1 | | |
| Nonanols | 24.5 | | |
| Acetone | | 18.6 | 33.8. |
| 2-Hexanone | | 24.2 | 24.7. |
| 2-Hexanol | | 25.4 | 17.9. |
| di-n-Butyl ketone | | 15.3 | 25.1. |
| Pot residue from dist., g | 41.2 | 50.8 | 47.9. |
| Acid, g. mol | 0.84 | 1.0 | 0.88. |
| Hydrogen, g. mol | 4.5 | 1.3 | |
| Conversion of Charge Alcohol, Mol Percent | 29.7 (total alcohols); 14.2 (propionic acid) | 26.8 (total for alcohols and ketones); 16.5 (propionic acid) | 32.9 (total for alcohols and ketones); 14.8 (propionic acid). |
| Total Charge Alcohol Accounted for, Percent | 82.4 [1] | 88.5 [2] | 87.3 [3] |

[1] Includes 19.4% alcohol present in pot residue.
[2] Includes 20.3% alcohol present in pot residue.
[3] Includes 20.6% alcohol present in pot residue.

From the foregoing example it is evident that a reaction mixture such as employed in run 1 using only a primary alcohol as a reactant resulted in the formation of nothing but alcohols. However, by employing a mixture of both primary and secondary alcohols in accordance with the conditions of our invention it will be seen that ketones were produced in predominating amounts. Also it will be observed that while 1-propanol when employed alone as in run 1 did not yield a ketone or ketones, the di-n-butyl ketone as well as 2-hexanone produced in runs 2 and 3 obviously were in part derived from 1-propanol. On a mol. percent basis the yields of products and their tion catalyst and a mild dehydrogenation catalyst, and continuously removing the water formed as a result of the involved reaction.

2. The process of claim 1 in which the reaction mixture employed comprises a mixture of $C_2$ to $C_5$ alcohols and the pressure utilized ranges from about 90 to about 150 p. s. i. g.

3. The process of claim 2 in which an alkali metal alcoholate is the condensation catalyst employed and the dehydrogenation catalyst is a nickel catalyst.

4. The process of claim 3 in which the reaction mixture is composed of 1-propanol and 2-propanol to produce a reaction product containing primarily acetone, di-n-butyl ketone and 2-hexanone.

References Cited in the file of this patent

UNITED STATES PATENTS

| | | |
|---|---|---|
| 2,046,145 | Arnold | June 30, 1936 |
| 2,173,114 | Howk et al. | Sept. 19, 1939 |
| 2,645,667 | Burgoyne | July 14, 1953 |
| 2,697,730 | Mecorney et al. | Dec. 21, 1954 |

OTHER REFERENCES

Guerbet: "Academie des Sciences," pp. 129–132, vol. 149 (July-December) 1909.